(12) United States Patent
Reingewirtz

(10) Patent No.: US 10,422,471 B2
(45) Date of Patent: Sep. 24, 2019

(54) MAGNETIC HANGING DEVICE

(71) Applicant: D.R. BIKE LTD., Ramat Hasharo (IL)

(72) Inventor: David Reingewirtz, Ramat Hasharon (IL)

(73) Assignee: D. R. BIKE LTD., Ramat Hasharon (IL)

( * ) Notice: Subject to any disclaimer, the term of this patent is extended or adjusted under 35 U.S.C. 154(b) by 177 days.

(21) Appl. No.: 15/090,469

(22) Filed: Apr. 4, 2016

(65) Prior Publication Data

US 2016/0215925 A1 Jul. 28, 2016

Related U.S. Application Data

(63) Continuation-in-part of application No. 13/763,939, filed on Feb. 11, 2013, now abandoned, which is a
(Continued)

(51) Int. Cl.
*B32B 3/30* (2006.01)
*F16M 13/02* (2006.01)
(Continued)

(52) U.S. Cl.
CPC ......... *F16M 13/022* (2013.01); *A47B 97/001* (2013.01); *A47G 1/17* (2013.01);
(Continued)

(58) Field of Classification Search
CPC .... Y10S 428/90; F16M 13/005; F16M 13/02; F16M 13/022; F16B 1/00; F16B 2001/0035; H01F 7/0215; Y10T 428/24008; Y10T 428/24132; Y10T 428/24174; Y10T 428/24479; Y10T 428/2457; Y10T 428/24612; Y10T 428/24628; Y10T 428/24669; Y10T 428/24694; B32B 3/26; B32B 3/28;
(Continued)

(56) References Cited

U.S. PATENT DOCUMENTS 3,298,124 A * 1/1967 Jahn .................... A47G 1/06
428/900
3,987,567 A 10/1976 Fritts
(Continued)

FOREIGN PATENT DOCUMENTS

JP 2005218487 8/2010

*Primary Examiner* — Megha M Gaitonde
(74) *Attorney, Agent, or Firm* — Mark David Torche; Patwrite Law

(57) ABSTRACT

A magnetic hanging device for use in combination with a magnetically attractive surface. The device includes: a magnetic hanger comprising a magnetic sheet and a magnetic-sheet reinforcement suspending layer having a rear side to which the magnetic sheet is fixed and a front side having a hanging member attached thereto; and a plurality of spaced apart ribs disposed on the front side of the hanger, at least one of the ribs being a single-piece non-segmented rib. The hanger is configured in proportion to Young's modulus of elasticity; the length of the ribs; the cube of the thickness of the reinforcement suspending layer; and indirectly proportional to the average distance between the ribs.

12 Claims, 11 Drawing Sheets

Related U.S. Application Data continuation-in-part of application No. PCT/IL2011/000652, filed on Aug. 10, 2011.

(60) Provisional application No. 61/344,512, filed on Aug. 12, 2010.

(51) Int. Cl.
| | |
|---|---|
| *A47B 97/00* | (2006.01) |
| *A47G 1/17* | (2006.01) |
| *H01F 7/02* | (2006.01) |
| *F16B 1/00* | (2006.01) |
| *H01F 1/117* | (2006.01) |

(52) U.S. Cl.
CPC .............. *F16B 1/00* (2013.01); *H01F 7/0215* (2013.01); *H01F 7/0252* (2013.01); *F16B 2001/0035* (2013.01); *H01F 1/117* (2013.01); *Y10T 29/4995* (2015.01); *Y10T 428/24669* (2015.01)

(58) Field of Classification Search
CPC ........... B32B 3/30; B32B 15/04; B32B 15/18; B32B 2307/20; B32B 2307/208
USPC ......... 428/99, 114, 119, 120, 121, 122, 130, 428/156, 157, 163, 164, 167
See application file for complete search history.

(56) References Cited

U.S. PATENT DOCUMENTS

| | | |
|---|---|---|
| 2003/0106913 A1 | 6/2003 | Kohno |
| 2008/0087785 A1 | 4/2008 | Roche |
| 2013/0149504 A1* | 6/2013 | Reingewirtz ............ A47G 1/17 428/179 |

* cited by examiner

MAGNETIC HANGING DEVICE

CROSS REFERENCE TO RELATED APPLICATIONS

This application is a Continuation-in-Part of U.S. application Ser. No. 13/763,939 entitled "Suspending Device" filed on Feb. 11, 2013, which is a Continuation-In-Part of International Patent Application No. PCT/IL2011/000,652, filed on Aug. 10, 2011, and claims priority from U.S. Provisional Patent Application No. 61/344,512, filed on Aug. 12, 2010, which applications are hereby incorporated by reference in their entirety.

FIELD OF THE INVENTION

The present invention relates to devices for hanging pictures, shelves or the like and, more specifically, to a magnetic suspending device.

BACKGROUND OF THE INVENTION

Flexible permanent magnetic materials are often supplied in the form of sheets or rolls and have been commercially available for many years. These materials are typically prepared by mixing a powdered ferrite material with a suitable polymeric or plastic binder into a uniform mixture. The polymeric materials are often elastomers, and the process is therefore typically accomplished through the use of sheet extrusion or calendering. The mixture is converted into strip or sheet form, providing a permanent stable product that is usually somewhat flexible, and that can readily be handled and made into elements of any desired shape by cutting and/or stamping.

The magnetic material is permanently magnetized so that the resulting elements can act individually as permanent magnets, the magnetic field being of sufficient strength that they will adhere to a magnetically attracted material, such as an iron or steel sheet. Many magnetic materials and the resultant sheet materials are typically inherently dark in color and it is therefore usual to attach these magnets to a printable substrate such as paper or plastic by gluing. A decorative pattern and/or other information may be printed on that paper or plastic. A popular application of such materials is thin, flat magnets having on their outer surface a decorative pattern and/or promotional information, including advertisements in direct mailings, newspaper inserts, and so forth, box toppers, coupons, business cards, calendars, greeting cards, postcards, and so forth.

A minimal force, Fmin, of attractive interaction between a magnetizable plate and a magnetic member is defined by the following expression:

$$Fmin > Fg \cdot Kfr \quad \text{(equation 1)}$$

where Fg is a force applied to the magnetic member by the hanged object due to gravity; Kfr is a coefficient of friction between the magnetizable plate and the magnetic member.

The force of magnetic attraction between two substantially flat bodies where one of them is a flat permanent magnet and another is a plate made of a magnetizable material depends on the following parameters: (a) magnetic moment per unit volume of the magnet; (b) magnet volume; (c) magnetization value of the magnetizable material; and (d) contact area between the magnet and magnetizable member.

The force Fmin is proportional to each abovementioned parameters.

It is believed that the technology relevant to the present invention is disclosed in: U.S. Pat. No. 3,987,567 (Fritts, 1976 Oct. 16): US 2003/106,913 (Kohno, 2003 Jun. 12); US 2008/087,785 (Roche, 2008 Apr. 7); and JP 2005/218,487 (Ogushi, 2010 Aug. 18), all of which are incorporated herein by reference.

SUMMARY OF THE INVENTION

The present invention provides a device that allows for convenient fixing of a picture, shelf, television, guitar or the like, at least temporarily (i.e. removably) on a magnetic surface.

In accordance with embodiments of one aspect of the present invention there is provided a magnetic hanging device for use in combination with a magnetically attractive surface. The device includes: a magnetic hanger comprising a magnetic sheet and a magnetic-sheet reinforcement suspending layer having a rear side to which the magnetic sheet is fixed and a front side having a hanging member attached thereto; and a plurality of substantially rigid spaced apart ribs disposed on the front side of the hanger, at least one of the ribs being a single-piece non-segmented rib. The hanger is configured in accordance with the following equation:

$$\frac{E \cdot L \cdot t^3}{D^2}$$

wherein E is Young's modulus of elasticity, in giga Pascals; L=the length of the ribs in centimeters; t=the thickness of the reinforcement suspending layer, in tenths of millimeters; and D=the average distance between the ribs, in centimeters; and, with the resulting numerical value of the equation is in the range of 1,800 to 60,000.

In some embodiments, the resulting numerical value of the equation is in the range of 5,000 to 40,000. In some embodiments, the resulting numerical value of the equation is in the range of 16,000 to 32,000.

In some embodiments, the device is configured for use with a non-flat magnetically attractive surface.

In some embodiments, at least one of the ribs is formed by a longitudinal fold. In some embodiments, the ribs are spaced apart by a distance greater than the width of the ribs. In some embodiments, the hanger has top and bottom edges and the ribs extend to at least one of said edges. In some embodiments, the hanger has right and left side edges and the ribs are parallel to at least one of said edges. In some embodiments, the ribs are parallel to each other. In some embodiments, at least some of the ribs are not all parallel to each other. In some embodiments, the ribs are flared out with respect to each other. In some embodiments, the ribs are diagonally arranged a long a path with respect to the hanger.

In some embodiments, at least one of the ribs has a cutout configured so that an object can be hung therefrom. In some embodiments, the device further includes one or more pull flaps.

It is a particular feature of the present magnetic hanging device that it can relatively easily be removed/disengaged from a magnetized surface by an initial separation of a corner or edge of the device from the magnetized surface after which the device readily detaches from the surface. Without limitation to theory, it is believed that a combination of the material properties and configuration of the device allow for the aforementioned ease in detachment, which includes: Young's modulus of elasticity; material thickness; rib length; and rib spacing.

Again, without limitation to actual operation, the readily removable hanging device is, in some embodiments, configured so that it is removed in a "popping" manner once an appropriate portion of a corner or edge of the device is separated from the magnetically attractive surface, which is in contrast to a peeling type of removal. This "popping" is a result of the extremely lower force required once a corner or edge is disengaged. In this regard, removal of the device occurs upon a bending thereof rather than peeling.

One advantage of the present device is the possibility of a significant increase in the load that can be carried or hung, yet with relative ease of removal of the device from the magnetically attractive surface.

Another advantage is that use of the device in combination with a magnetically attractive surface, the location of the object to be hung/supported can be conveniently changed, and without any actions such as removing a nail or screw and re-nailing/re-screwing.

Thus, the present invention provides a magnetic hanging device that is configured to hang/support objects, including relatively heavy objects, while being flexible in location and being relatively easy to separate from the magnetically attractive surface. Furthermore the hanging device does not require fasteners such as nails, screw bolts or hooks, which in some cases may only be good for one-time use and that may require locating a stud in a wall (which may limit the hanging location); does not require drilling and resultant noise and dust; and is without the worry of weakening of the connection over time, which often causes shelves or pictures to fall. Also, if one wishes to remove a shelf/picture, there is no fastener or hole remaining in the wall or surface.

BRIEF DESCRIPTION OF THE DRAWINGS

The present invention will be understood and appreciated more fully from the following detailed description taken in conjunction with the appended drawings in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF THE INVENTION

The following detailed description of embodiments of the invention may refer to the accompanying drawings. Embodiments and/or limitations featured in the figures are chosen for convenience or clarity of presentation and are not meant to limit the scope of the invention.

Illustrative embodiments of the invention are described below. In the interest of clarity, not all features/components of an actual implementation are necessarily described.

Figure 1A:
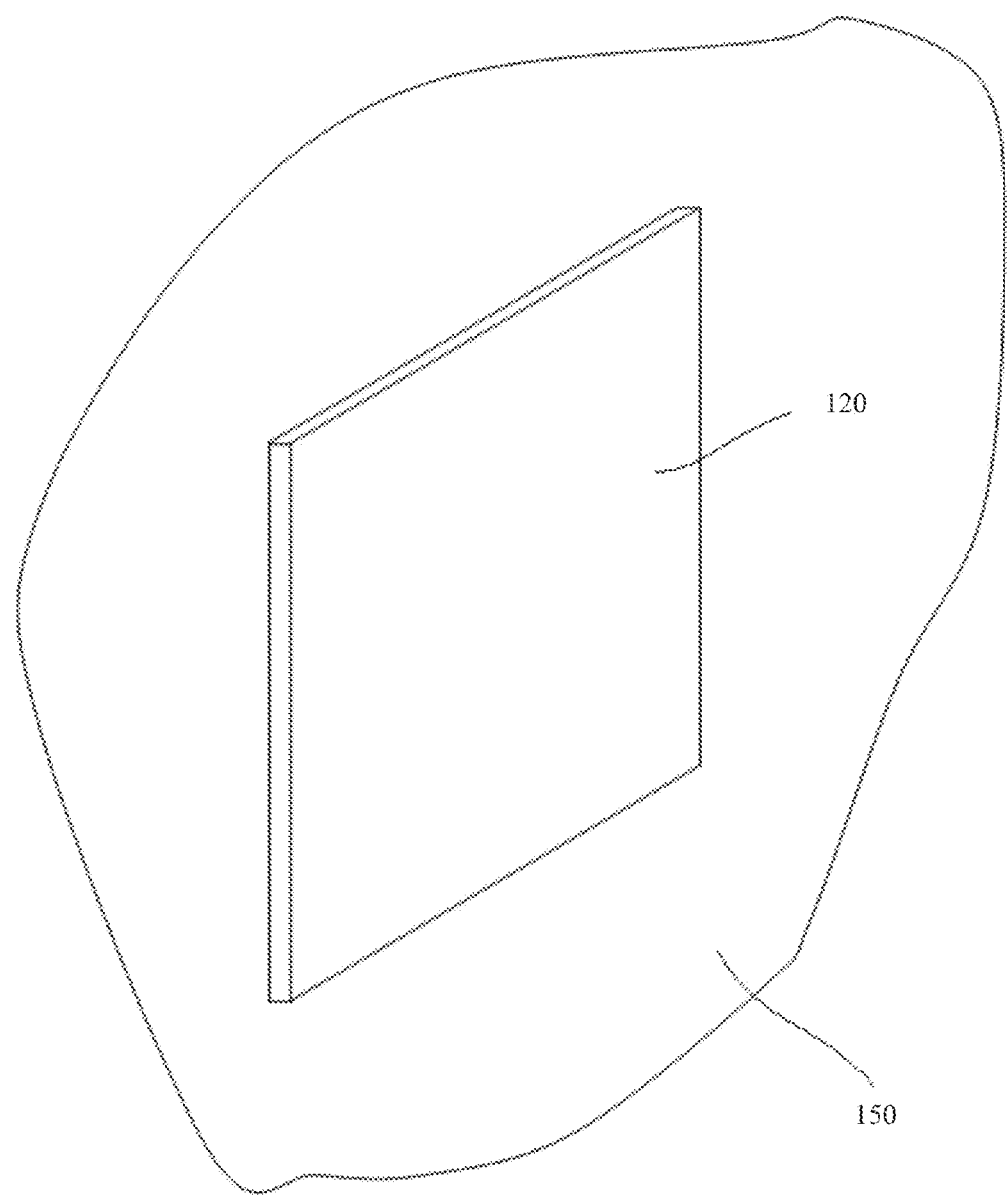
FIG. 1A is a perspective view of a magnetically attractive surface attached to a surface of interest such as a wall.

FIG. 1A shows a magnetically attractive surface 120 (e.g. including any or a combination of iron, nickel, cobalt or manganese) that is mechanically fixed to a surface of interest 150, e.g. a room wall. Any surface including a curved surface situated at any angle relative to gravity direction is in the scope of the current invention.

Figure 1B:
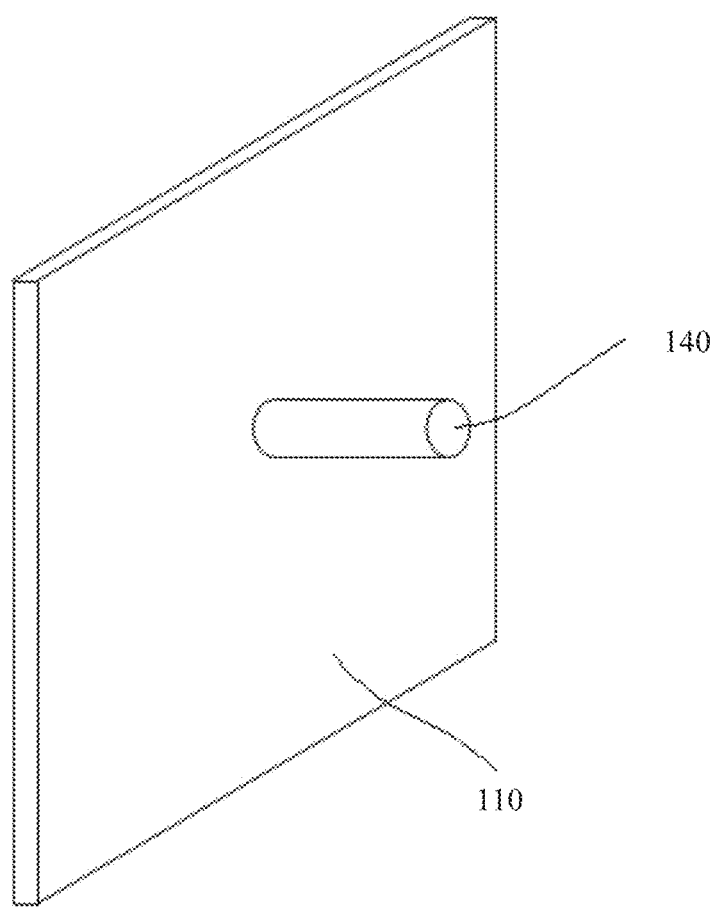
FIG. 1B is a perspective view of an embodiment of a magnetic hanging device of the present invention, usable in combination with, for example, the magnetically attractive surface illustrated in FIG. 1.

FIG. 1B shows an embodiment of a somewhat flexible magnetic hanger 110 provided with a hanging element 140 configured so that a load such as an artwork piece, wall clock, book shelf, ledge, night stand and so on (not shown) can be hung therefrom or supported thereby. The magnetic hanger 110 includes a somewhat flexible permanent magnet, typically prepared by mixing a powdered ferrite, neodymium or NdFeB material with a suitable polymeric or plastic binder into a uniform mixture. The mixture is converted into sheet form by extrusion or calendering.

Figure 2A:
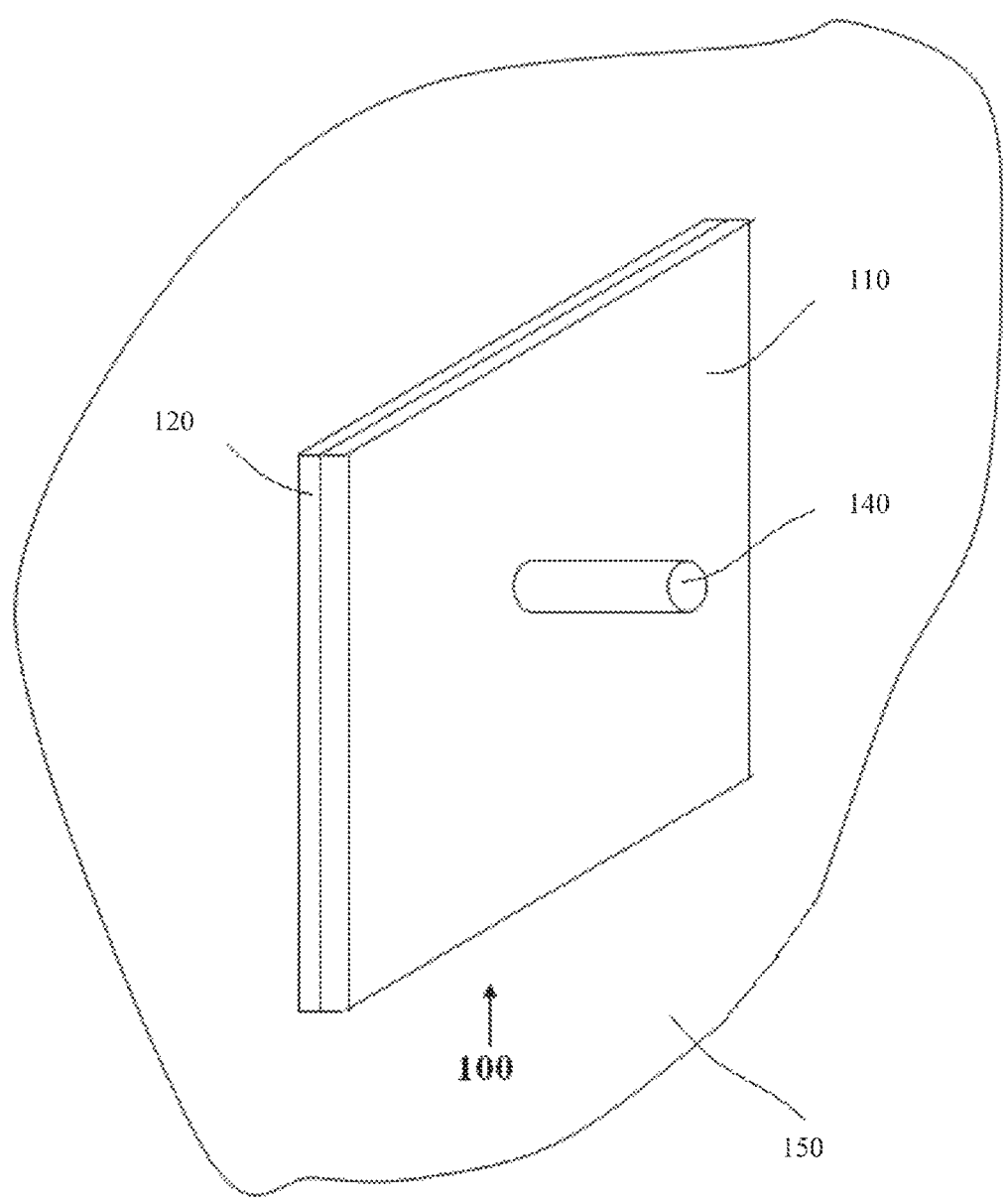
FIG. 2A is a perspective view of an embodiment of the magnetic hanging device attached to a magnetically attractive surface.

FIG. 2A shows magnetic hanger 110 placed on magnetically attractive surface 120 mechanically connected to the surface of interest 150, which in some embodiments, constitute together the hanging device 100. When placed adjacent to magnetically attractive surface 120, the magnetic hanger 110 is magnetically fixed on the magnetizable surface 120 due to the force of magnetic attraction. As noted above, this force is proportional to a volume of the magnetic hanger 110 and the contact area. Thus, the carried load can be increased by means of sheet thickening and extension of the contact area.

Figure 2B:
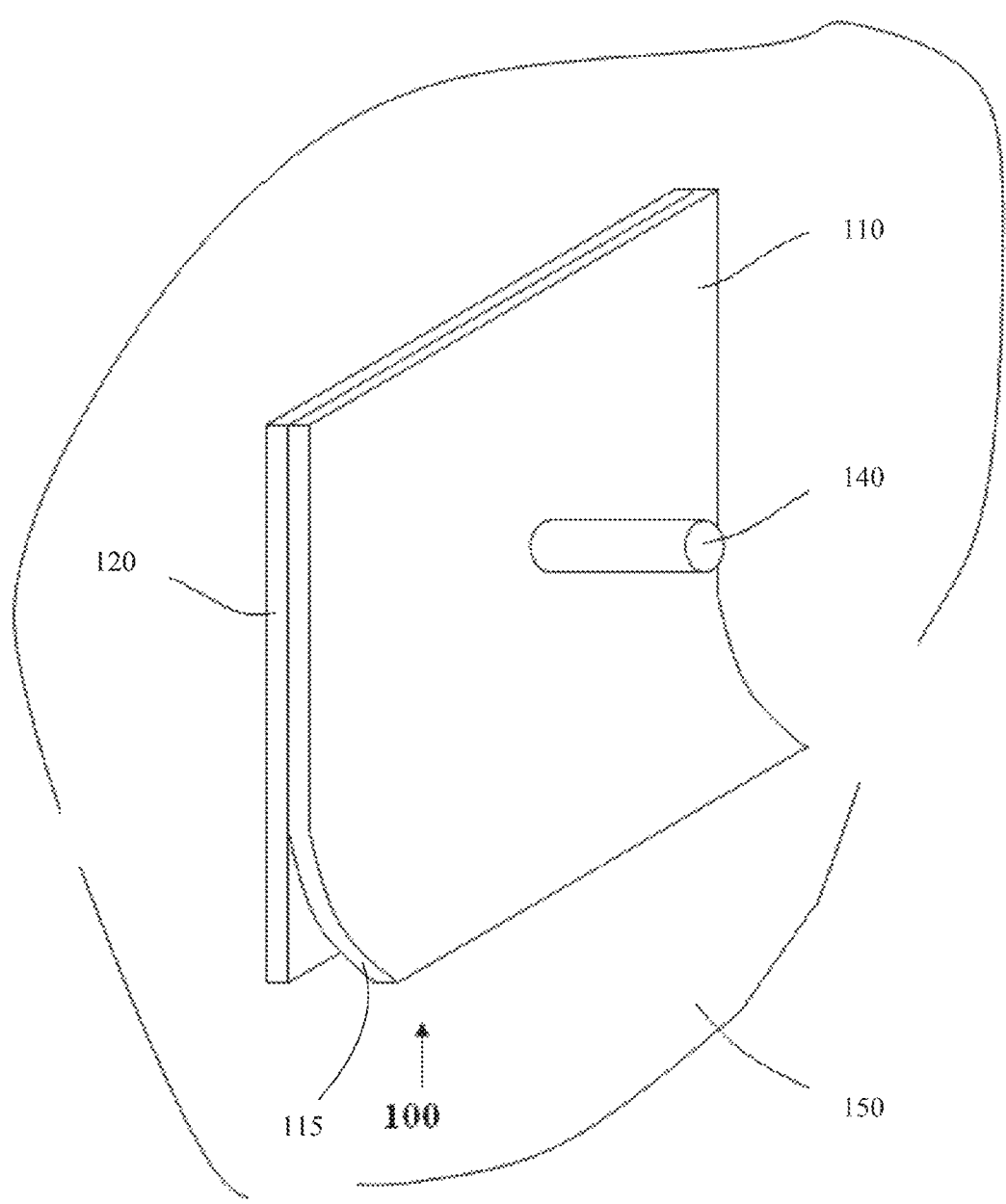
FIG. 2B is a perspective view of an embodiment of the magnetic hanging device illustrating an initial step of disengagement from the magnetically attractive surface.

FIG. 2B shows the magnetic hanger 110 at the initial step of disengagement from magnetically attractive surface 120, wherein an edge 115 of the hanger 110 has been slightly disengaged from the surface 120. Typically, due to properties of the hanger 110, once this initial disengagement has been accomplished, the hanging device will readily disengage from the magnetically attractive surface 120. The aforementioned properties, which may be one of or a combination of mechanical properties; device dimensions; and associated stiffening ribs including spacing, length, width and thickness of such ribs, will be discussed below.

Figure 3:
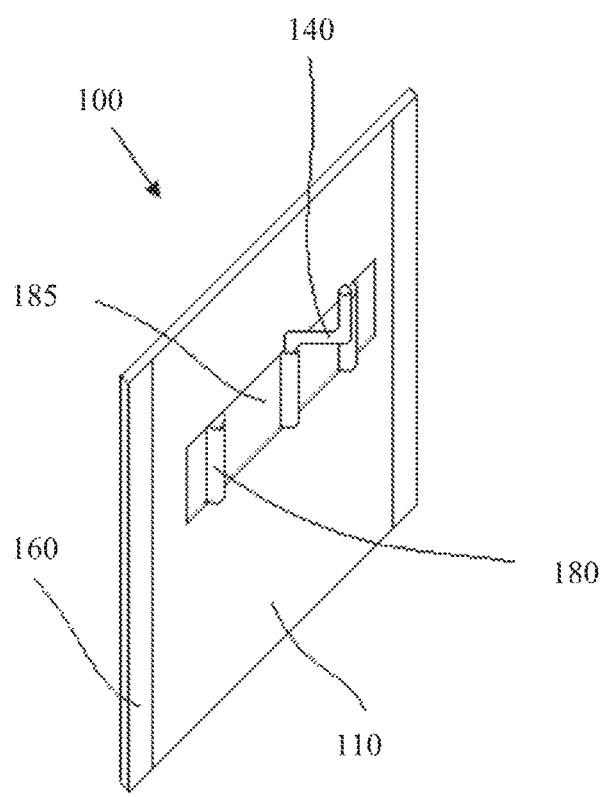
FIG. 3 is a perspective view of a magnetic hanging device of the device, including pull-flaps.

FIG. 3 shows an embodiment of hanging device 100 for permanently or temporarily suspending an object of interest. The magnetic hanger 110 includes pull flaps 160 that can be used to assist in pulling magnetic hanger 110 off of surface 120. Non-magnetic flaps 160 may be used. A plate 185 is provided with mortise-like ribs 180, which can be configured to provide a receiving portion for hanging element 140 and/or add strength to the hanging device; or even be configured so that an object can be directly hung therefrom.

Figure 4A:
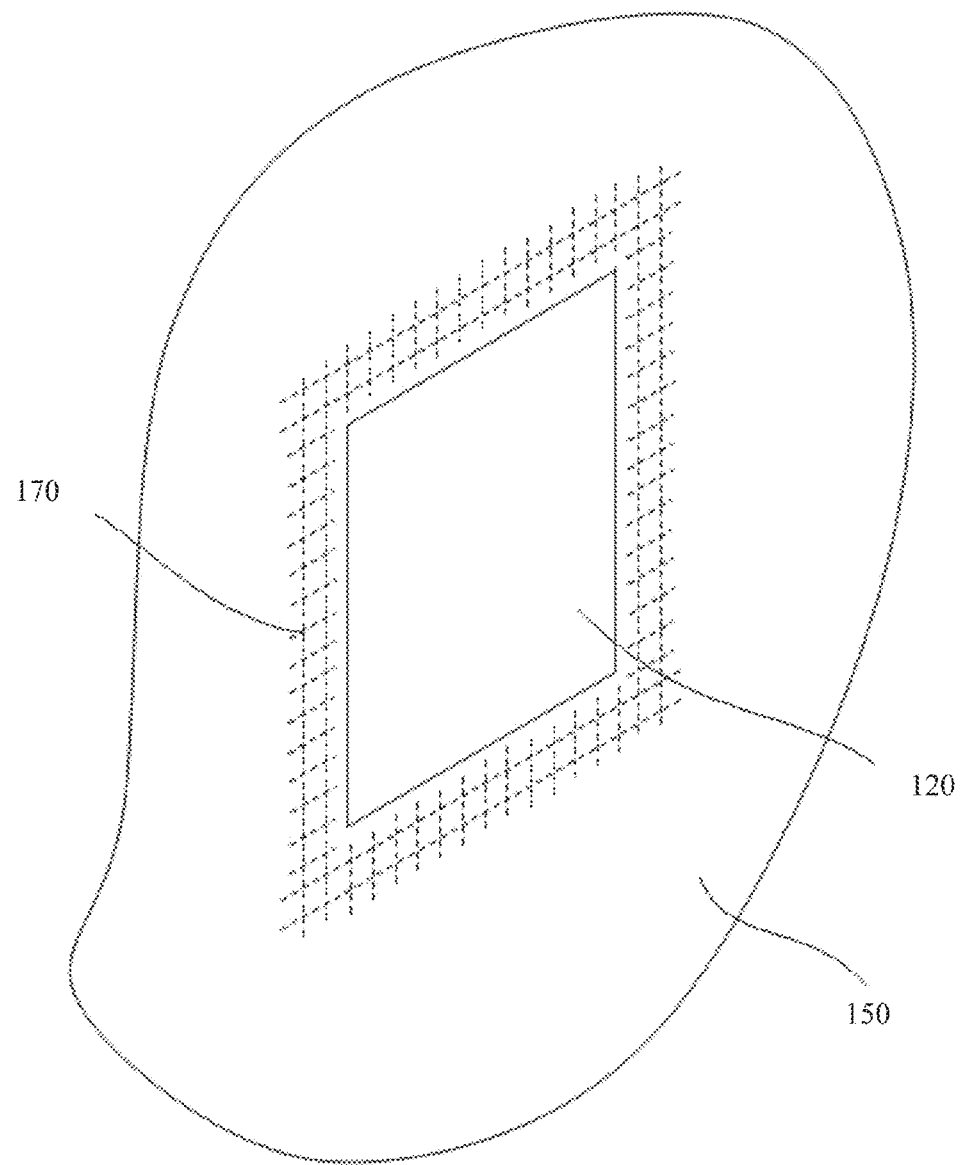
FIGS. 4A and 4B are respective perspective and cross-sectional views of the magnetically attractive surface underlain by a mesh.
Figure 4B:
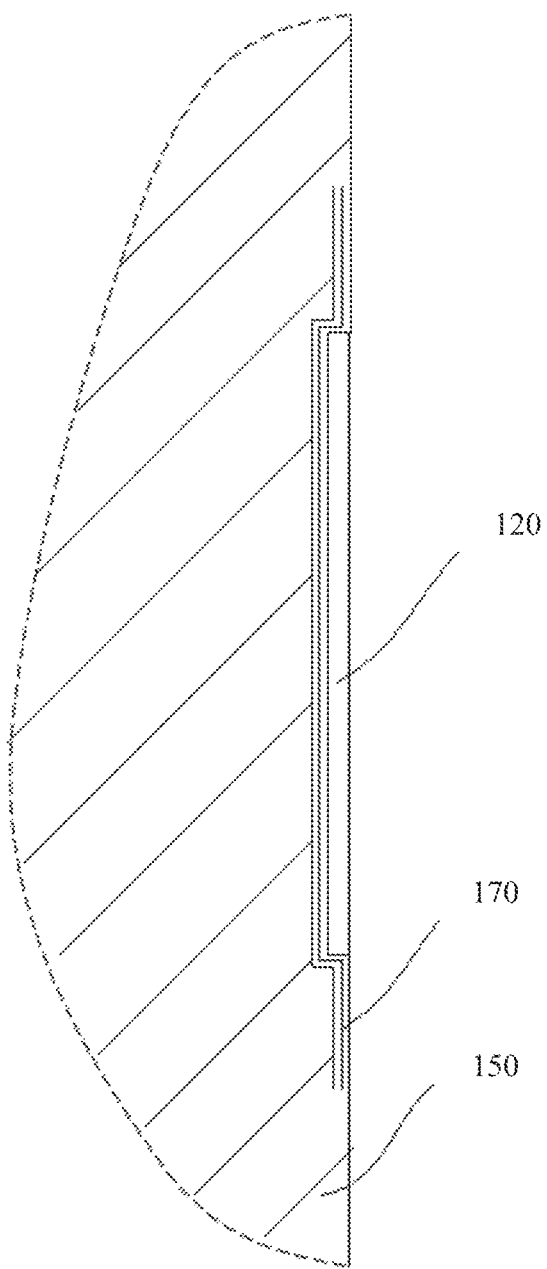

FIGS. 4A and 4B show magnetically attractive surface 120 attached to the surface of interest 150 wherein magnetically attractive surface 120 is underlain by a mesh 170, which may include a filler. In FIG. 4B, mesh 170 is a filled mesh 170, which is flush with the surface of interest 150.

Figure 5:
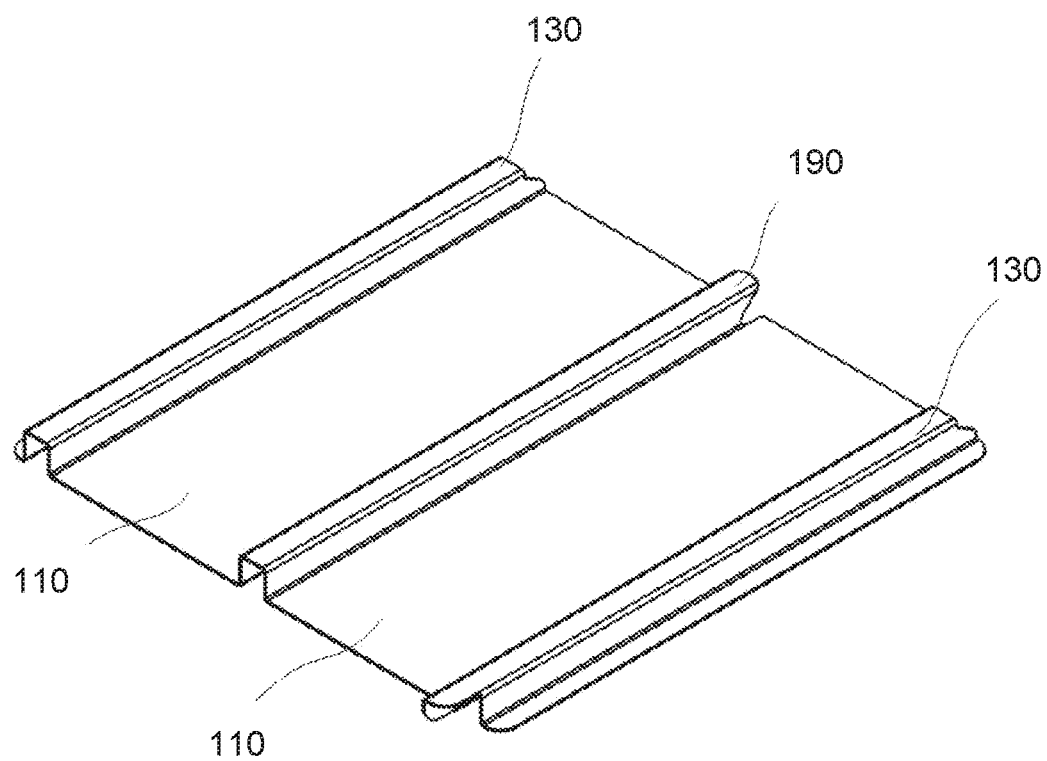
FIG. 5 is a perspective view of an embodiment of the magnetic hanging device with longitudinal folds.

FIG. 5 shows an embodiment of hanging device 100 wherein the flexible magnetic hanger 110 is provided with stiffening ribs 130 in the form of longitudinal folds, typically vertical, as shown, for additional strength in the direction parallel to the ribs, i.e. vertical in this case, which is typical. Rib 130 in the center, is illustrated with a hook/hanging mechanism constituted by an angled cut-out 190 at the top of a rib, from which an object of interest may be hung. It should be noted that, mutatis mutandis, the instant magnetic hanging device can be used to hang or support items such as book shelves and the like. In such case, the device may additionally or alternatively include a shelf supporting projection rather than a hook-like mechanism.

Figure 6:
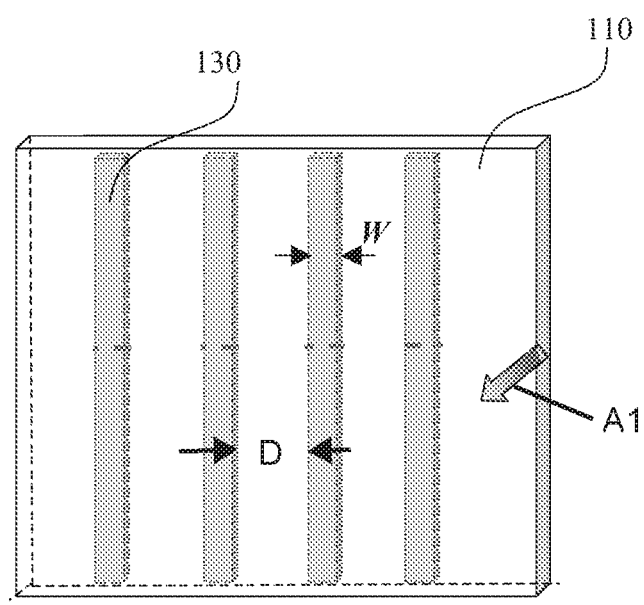
FIG. 6 is a perspective view of an embodiment of the magnetic hanging device including vertically arranged stiffening ribs.

FIG. 6 shows the magnetic hanger 110 wherein stiffening ribs 130 are solid ribs attached to the hanger, although the ribs could be integrally formed. Ribs 130 are parallel and spaced apart, and have a width W, which is narrower than the distance D between the ribs. The hanger 110 thus is reinforced to be considerably stiff and strong in the direction of ribs 130, yet still has some flexibility in the direction perpendicular to, or substantially perpendicular to, the ribs. As such, the device can be disengaged from magnetically attractive surface 120 by pulling generally at the location and direction of arrow A1.

Figure 7:
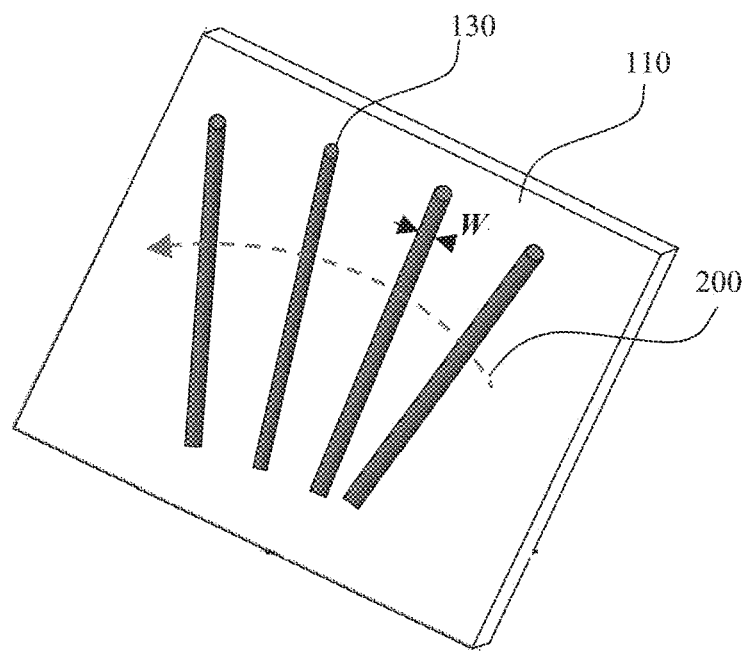
FIG. 7 is a perspective view of an embodiment of the magnetic hanging device with stiffening ribs in a flared arrangement.

FIG. 7 shows an embodiment of the device where ribs 130 are not parallel to each other, rather in a flaring pattern, and also do not extend the entire dimension of the hanger 110. Ribs 130 flare out in a generally arc-like path 200. Further, ribs 130 are exemplified as generally rod-shaped ribs. For the most part, ribs 130 have a width smaller than the space between them.

Figure 8:
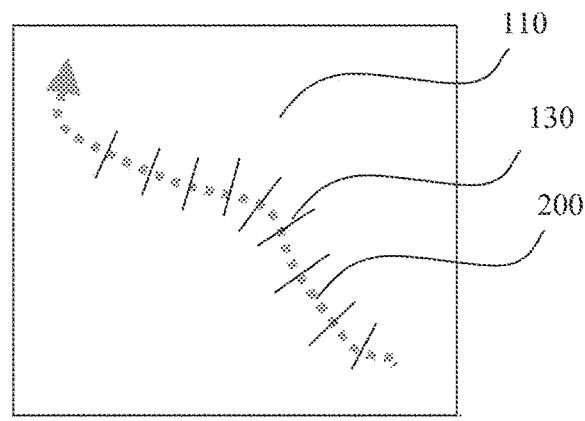
FIG. 8 is a front view of an embodiment of the magnetic hanging device with stiffening ribs arranged along a diagonal path.

FIG. 8 shows an embodiment of the device where ribs 130 are also not parallel to each other, do not extend the entire dimension of the hanger 110 and flare in two directions along a generally diagonal path 220. As such, the device can be removed from generally any direction, however, if ribs 130 were to extend mostly or all the way to the edges of the hanger 110, with the exemplary path 220 shown, the device would be designed to be pulled from either the lower right corner or upper left corner thereof, i.e. From a location generally most adjacent to one of the ends of path 220.

In some embodiments, ribs 130 can be in the form of elongated L-shaped brackets (not shown).

Figure 9:
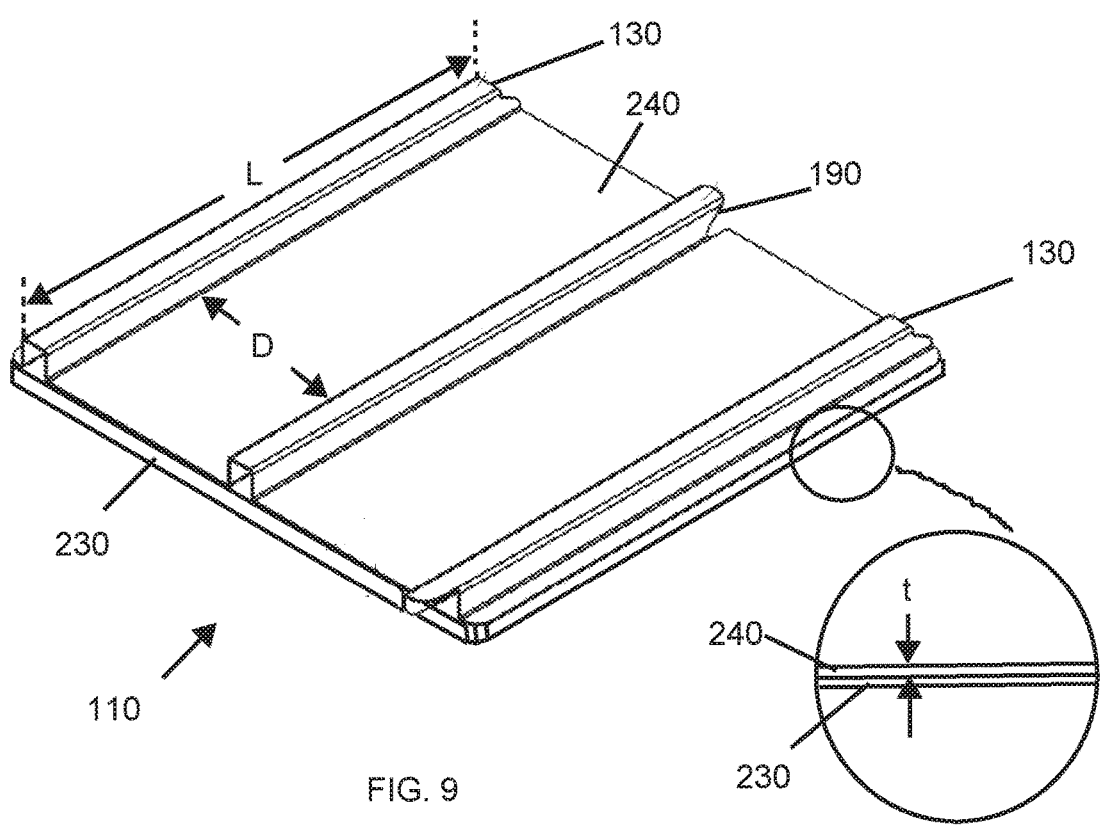
FIG. 9 is a perspective view of another embodiment of the magnetic hanging device.

FIG. 9 shows an embodiment where magnetic hanger 110 includes a magnetic sheet 230, typically rather flexible; and a generally sturdy magnetic-sheet reinforcement suspending layer 240, typically made of metal (e.g. steel, aluminum, etc.), a composite material or a sturdy plastic. Suspending layer 240 includes a hanging member such as hanging element 140, rib cut-out 190, a hook or any other appropriate member from which an object can be hung or by which an object can be supported.

With reference still to FIG. 9, in some embodiments, it is a particular feature of the hanging device that hanger 110 has properties (is designed) in accordance with the following equation:

$$\frac{E \cdot L \cdot t^3}{D^2}$$

Wherein E is Young's modulus of elasticity, in giga Pascals; L=the length of the ribs 130 in centimeters; t=the thickness of the hanger 110, (specifically the portion between the ribs 130, i.e. not including the rib thickness), in tenths of millimeters; and D=the average distance between the ribs 130, in centimeters. And, with the aforementioned units, the resulting numerical value of the equation is in the range of 1,800 to 60,000 and in some embodiments in the range 5,000 to 40,000 and in some embodiments within the range 16,000 to 32,000.

It may be considered that for practical purposes, where the device is designed in a manner generally in accordance with FIG. 9, i.e. with a magnetic sheet 230 backed by a reinforcing sheet 240 (typically but not limited to metal or plastic, typically a stiff plastic), the strength of the magnetic sheet is typically negligible, relatively.

It should be noted that ribs 130 are preferably and typically each configured as unitary single-piece elements, i.e. not as a series of elements arranged end to end to constitute the full length of the rib, rather each is a one-piece rib. It should be clear that if a rib were formed by a plurality of segments, that rib would not provide the same stiffening as a single-piece rib as any space between the segments would provide a possible bend point.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

What is claimed is:

1. A magnetic hanging device for use in combination with a magnetically attractive surface, the device comprising:
    a magnetic hanger comprising a magnetic sheet disposed at the rear outer face of the device and configured to directly interface with and magnetically interact with said magnetically attractive surface;
    a magnetic-sheet reinforcement layer having a rear side to which the magnetic sheet is fixed;
    a plurality of rigid and spaced apart stiffening ribs disposed on and protruding from said front side of the magnetic hanger so that the stiffening ribs have an exposed or free edge, at least one of the stiffening ribs being a single-piece non-segmented stiffening rib and at least one of the stiffening ribs comprises a cut-out from which an object may be hung; and
    a pull flap,
    wherein the magnetic-sheet reinforcement suspending layer must be configured in accordance with the following equation:

$$\frac{E \cdot L \cdot t^3}{D^2}$$

wherein:
    E is Young's modulus of elasticity, in giga Pascals;
    L=the length of the ribs in centimeters;

t=the thickness of the reinforcement suspending layer that is the portion between the ribs, in tenths of millimeters; and D=the average distance between the ribs, in centimeters; and the resulting numerical value of the equation is in the range of 1,800 to 60,000, wherein the magnetic hanging device bends rather than peels from the magnetically attractive surface whereby the magnetic hanging device is configured to allow it to hang objects while at the same time the magnetic hanging device can be removed and disengaged from said magnetically attractive surface by an initial pulling on said pull flap away from the magnetized surface.

2. The device of claim 1, capable of use with a non-flat magnetically attractive surface.

3. The device of claim 1, wherein at least one of the stiffening ribs comprises a longitudinal fold.

4. The device of claim 1, wherein the hanger has top and bottom edges and the stiffening ribs extend to at least one of said edges.

5. The device of claim 1, wherein the stiffening ribs are spaced apart by a distance greater than the width of the stiffening ribs.

6. The device of claim 1, wherein the hanger has right and left side edges and all of the stiffening ribs are parallel to at least one of said edges.

7. The device of claim 1, wherein the stiffening ribs are parallel to each other.

8. The device of claim 1, wherein the ribs are not all parallel to each other.

9. The device of claim 1, wherein the ribs are flared out with respect to each other.

10. The device of claim 1, wherein the stiffening ribs are diagonally arranged along a path with respect to the hanger.

11. The device of claim 1, wherein all of the ribs are vertically oriented.

12. A method of removing a magnetic hanging device that is configured for use in combination with a magnetically attractive surface, the method comprising:

(a) obtaining a magnetic hanger that comprises:
a magnetic sheet disposed at the rear outer face of the device and configured to directly interface with and magnetically interact with said magnetically attractive surface;
a magnetic-sheet reinforcement layer having a rear side to which the magnetic sheet is fixed;
a plurality of rigid spaced apart stiffening ribs disposed on and protruding from said front side of the magnetic hanger so that the stiffening ribs have an exposed or free edge, at least one of the stiffening ribs being a single-piece non-segmented stiffening rib and at least one of the stiffening ribs comprises a cut-out from which an object may be hung; and
a pull flap, and
wherein the magnetic-sheet reinforcement suspending layer must be configured in accordance with the following equation:

$$\frac{E \cdot L \cdot t^3}{D^2}$$

wherein:
E is Young's modulus of elasticity, in giga Pascals;
L=the length of the ribs in centimeters;
t=the thickness of the reinforcement suspending layer that is the portion between the ribs, in tenths of millimeters; and
D=the average distance between the ribs, in centimeters; and the resulting numerical value of the equation is in the range of 1,800 to 60,000,
whereby the magnetic hanging device is configured to allow it to hang objects while at the same time the magnetic hanging device can be removed and disengaged from said magnetically attractive surface; and (b) pulling on said pull flap away from the magnetized surface so that the magnetic hanging device bends, rather than peels, from the magnetically attractive surface so as to disengage the magnetic hanging device from the magnetically attractive surface.

* * * * *